US008733705B2

(12) United States Patent
Hsieh

(10) Patent No.: US 8,733,705 B2
(45) Date of Patent: May 27, 2014

(54) AIRCRAFT RESCUE DEVICE

(76) Inventor: Lu-Ho Hsieh, New Taipei (TW)

(*) Notice: Subject to any disclaimer, the term of this patent is extended or adjusted under 35 U.S.C. 154(b) by 173 days.

(21) Appl. No.: 13/366,381

(22) Filed: Feb. 6, 2012

(65) Prior Publication Data

US 2013/0200206 A1 Aug. 8, 2013

(51) Int. Cl.
*B64D 19/00* (2006.01)

(52) U.S. Cl.
USPC .......................................................... 244/139

(58) Field of Classification Search
USPC .................... 244/139, 138 R, 2, 1 R
See application file for complete search history.

(56) References Cited

U.S. PATENT DOCUMENTS

| | | | | | |
|---|---|---|---|---|---|
| 2,227,204 | A | * | 12/1940 | Sepko | 244/17.15 |
| 3,389,880 | A | * | 6/1968 | Ferguson | 244/137.1 |
| 4,884,769 | A | * | 12/1989 | Snead | 244/145 |
| 6,824,102 | B2 | * | 11/2004 | Haggard | 244/110 F |
| 7,523,891 | B2 | * | 4/2009 | Hakki et al. | 244/152 |
| 8,016,239 | B2 | * | 9/2011 | Hakki et al. | 244/139 |
| 8,100,365 | B2 | * | 1/2012 | Fleming, II | 244/139 |
| 8,191,831 | B2 | * | 6/2012 | Nadir | 244/149 |
| 2004/0099768 | A1 | * | 5/2004 | Chak et al. | 244/139 |
| 2013/0233964 | A1 | * | 9/2013 | Woodworth et al. | 244/2 |

* cited by examiner

*Primary Examiner* — Christopher P Ellis
(74) *Attorney, Agent, or Firm* — Leong C. Lei

(57) ABSTRACT

At least a first rescue device for receiving rescue is configured on a bottom side of an aircraft and at least a second rescue device for providing rescue is configured on a bottom side of the aircraft. The first and second rescue devices can be optionally configured. For a small aircraft, only the first rescue device for receiving rescue can be configured. For a large aircraft, both the first and second rescue devices for providing and receiving rescue can be simultaneously or optionally configured. When an aircraft with the first rescue device for receiving rescue suffers loss of power, insufficient power, or control difficulty, another aircraft with the second rescue device for providing rescue can fly on top of the former and their first and second rescue devices can be linked together so that the troubled aircraft can be pulled away to land in a safe place.

4 Claims, 4 Drawing Sheets

AIRCRAFT RESCUE DEVICE

TECHNICAL FIELD OF THE INVENTION

The present invention is generally related to rescue devices for aircrafts, and more particular to a rescue device preventing an aircraft from crashing.

DESCRIPTION OF THE PRIOR ART

Aviation has been the major transportation means due to its speed and efficiency. However, there are also various security and safety issues associated with aviation. For example, fuel may run out during the flight and various measures have been proposed such as a fuel supply plane for filling up another plane directly in the air. On the other hand, if a plane loses its power, has insufficient power, or suffers some control problem, there is still no immediate rescue means available.

SUMMARY OF THE INVENTION

Therefore a novel rescue device is provided herein to prevent an aircraft from crashing.

A major objective is to have a first rescue device on one aircraft and a second rescue device on another aircraft. As such, when the former needs rescue, the latter can pull the to-be-rescued aircraft to a safe place.

A second objective is that the rescue device can be hidden in the aircraft or extended to an appropriate place by rail from the aircraft.

Yet another objective is that the rescue device can be detached when the rescued one is too heavy to pull so as to protect those on the rescuing aircraft.

Still another objective is that the rescue devices for rescuing or being rescued can be optionally configured on an aircraft or both can be configured simultaneously on an aircraft.

To achieve the above objectives, at least a first rescue device for receiving rescue is configured on a bottom side of an aircraft and at least a second rescue device for providing rescue is configured on a bottom side of the aircraft. The first and second rescue devices can be optionally configured. For a small aircraft, only the first rescue device for receiving rescue can be configured. For a large aircraft, both the first and second rescue devices for providing and receiving rescue can be simultaneously or optionally configured. When an aircraft with the first rescue device for receiving rescue suffers loss of power, insufficient power, or control difficulty, another aircraft with the second rescue device for providing rescue can fly on top of the former and their first and second rescue devices can be linked together so that the troubled aircraft can be pulled away to land in a safe place.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
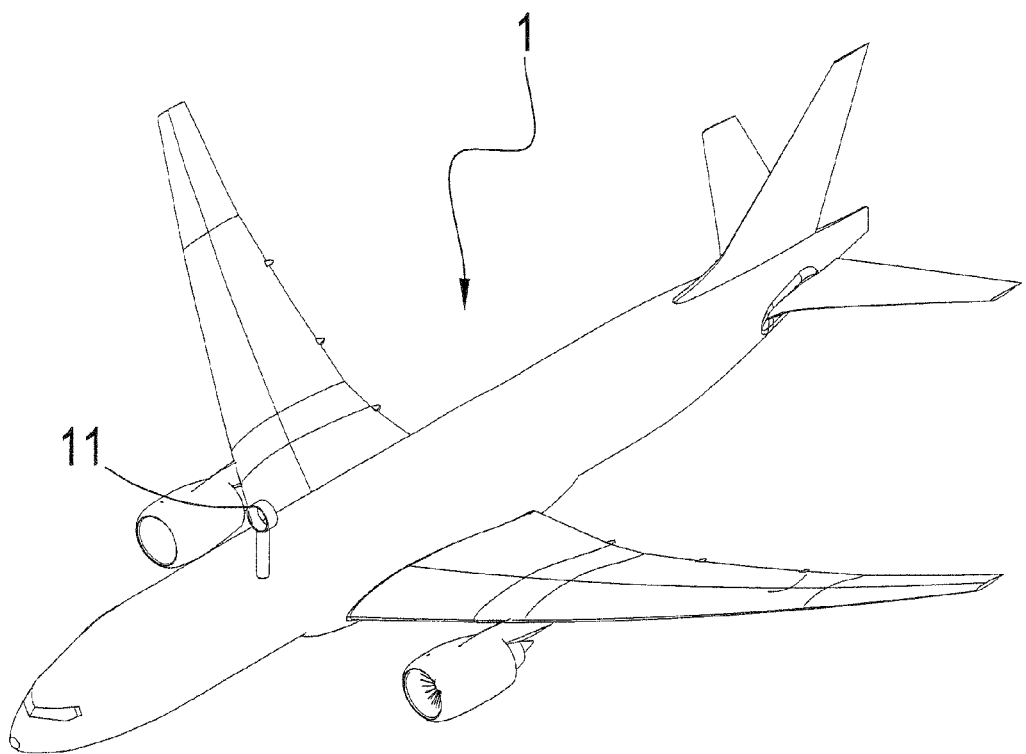
FIG. 1 is a perspective diagram showing a first rescue device on an aircraft according a first embodiment of the present invention.

An aircraft 1 equipped with a first rescue device 11 according to a first embodiment of the present invention is illustrated in FIG. 1. The aircraft 1 is a light airliner, a civil airliner, a freighter plane, a fighter plane, a trainer plane, an un-manned plane, or a fuel supply plane.

The first rescue device 11 is positioned at an appropriate place on a top side of the aircraft 1 and can be a ring, a hook, or a sphere. The first rescue device 11 can be fixedly configured on or extended by rail from the aircraft 1. The first rescue device 11 can also be extended by explosive or spring.

Figure 2:
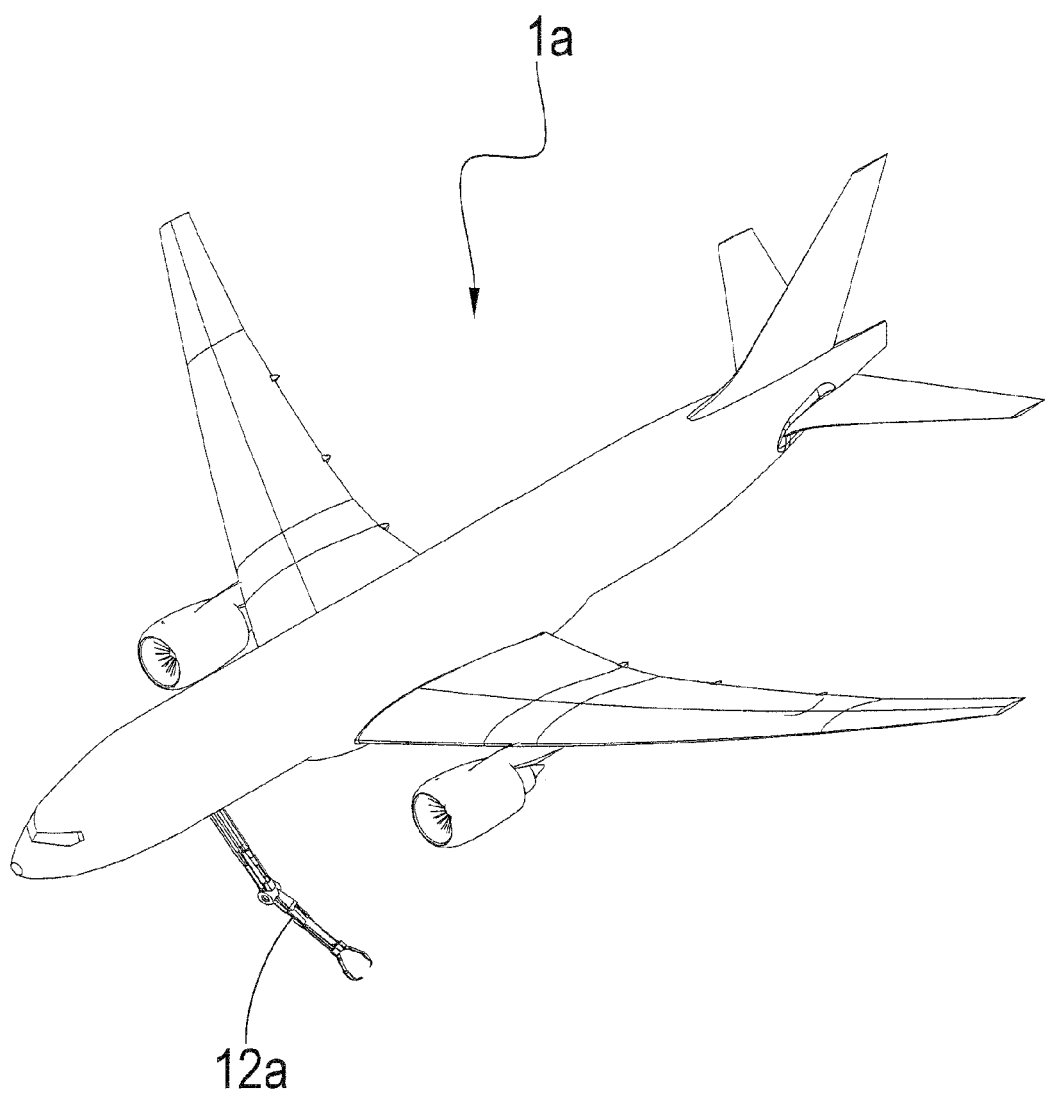
FIG. 2 is a perspective diagram showing a second rescue device on an aircraft according a second embodiment of the present invention.

An aircraft 1a equipped with a second rescue device 12a according to a second embodiment of the present invention is illustrated in FIG. 2.

The second rescue device 12a is positioned at an appropriate place on a bottom side of the aircraft 1a and can be a mechanical arm, a joint ring or hook corresponding to the first rescue device 11. In the present embodiment, a mechanical arm is adopted.

Figure 3:
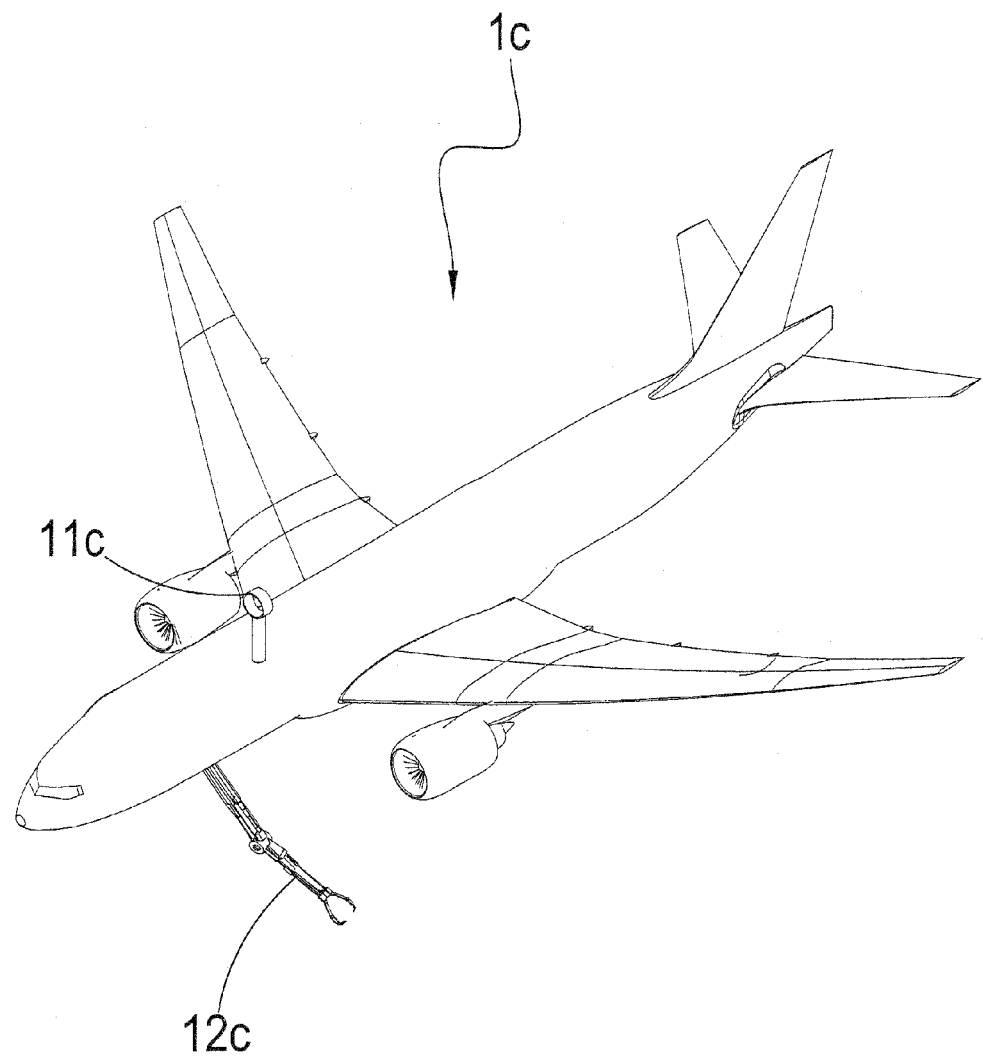
FIG. 3 is a perspective diagram showing a first rescue device and a second rescue device on an aircraft according a third embodiment of the present invention.

An aircraft 1c equipped with a first rescue device 11c and a second rescue device 12c according to a third embodiment of the present invention is illustrated in FIG. 3.

The first rescue device 11c is positioned at an appropriate place on a top side of the aircraft 1c and can be a ring, a hook, or a sphere. The first rescue device 11 can be fixedly configured on or extended by rail from the aircraft 1c.

The second rescue device 12c is positioned at an appropriate place on a bottom side of the aircraft 1c and can be extensible or flexible. The second rescue device 12c can have a mechanical arm, a joint ring or hook corresponding to the first rescue device 11c at one end.

Figure 4:
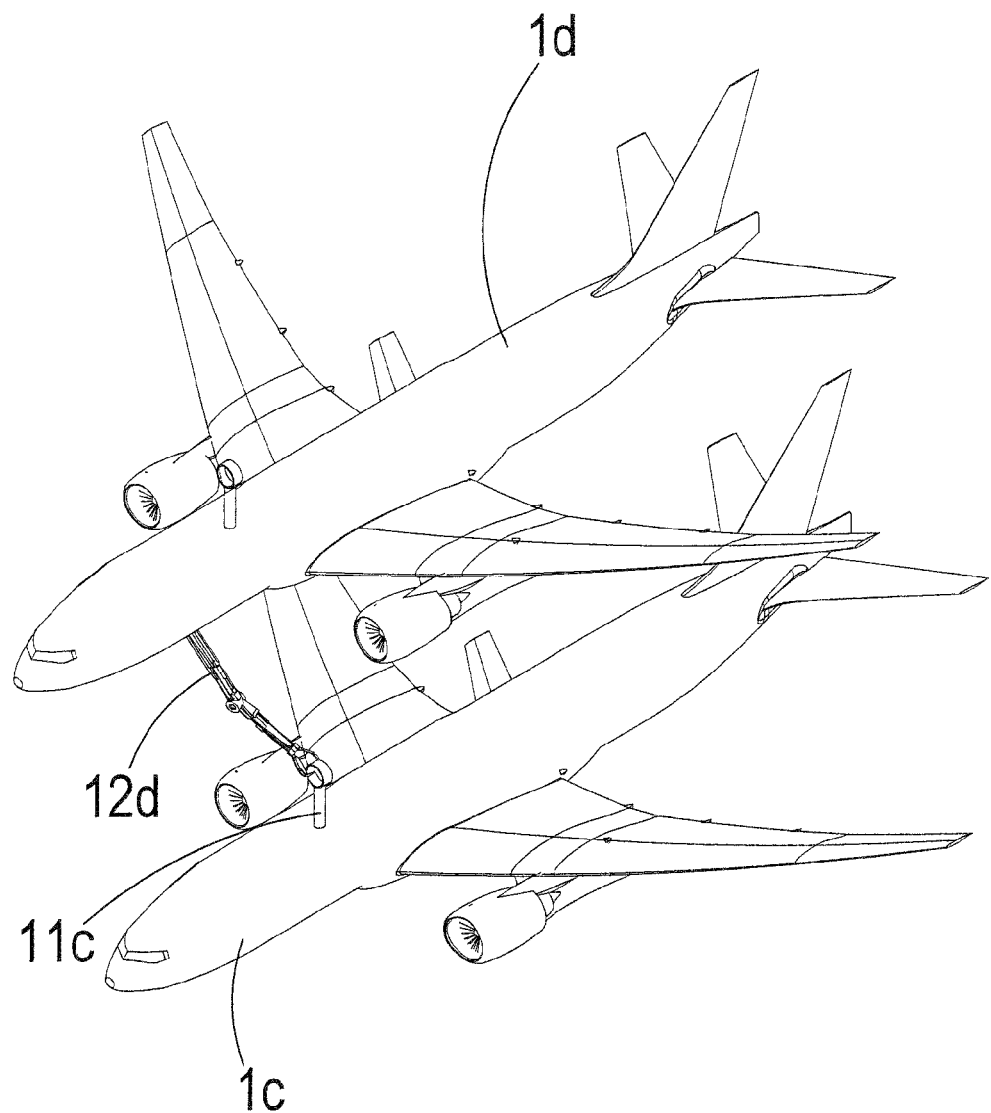
FIG. 4 shows an operation scenario of the third embodiment of the present invention.

An operation scenario of the third embodiment of the present invention is shown in FIG. 4. As illustrated, when an aircraft 1c suffers loss of power and has to be rescued, another aircraft 1d can have its second rescue device 12d extended and linked with the first rescue device 11c on the to-be-rescued aircraft 1c. The aircraft 1d then can sustain and pull the powerless aircraft 1c away so that the aircraft 1c will not crash.

Therefore, the aircraft rescue device of the present invention has the following characteristics.

Firstly, the second rescue device on an aircraft is able to provide aviation rescue to another aircraft with the first rescue device so that the latter can survive various disasters.

Secondly, the first rescue device can be hidden and extended by rail, explosive, or spring to an appropriate configuration when required.

Thirdly, the second rescue device can be hidden in the aircraft's belly and extended when required. If the rescued aircraft is too heavy, the second rescue device can be detached to protect the rescuing aircraft.

Finally, the first and second rescue devices can be optionally configured on an aircraft, or both first and second rescue devices can be simultaneously configured on an aircraft.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An aircraft rescue device, comprising:
    a first aircraft; and
    a first rigid rescue device in the form of a ring attached to a top side of said first aircraft;
    wherein said first rescue device extends from said top side of said aircraft and is attached via a rail;
    a second aircraft comprising a detachable and extensible second rescue device attached to a bottom side of said second aircraft and configured to connect with said first rescue device during a rescue operation.

2. The aircraft rescue device according to claim 1 wherein said second rescue device is flexible.

3. The aircraft rescue device according to claim 1 wherein said second rescue device has a mechanical arm.

4. The aircraft rescue device according to claim 1 wherein said second rescue device has a jointed hook at one end.

* * * * *